(12) United States Patent
Mizobe

(10) Patent No.: US 6,494,082 B1
(45) Date of Patent: Dec. 17, 2002

(54) METHOD OF AND APPARATUS FOR TESTING AIRTIGHTNESS OF CLOSED SPACE PROVIDED WITH STEAM MOVEMENT CONTROL DEVICE

(76) Inventor: Kunitaka Mizobe, 1-6-7, Hoshikuma, Jyonan-ku, Fukuoka-shi, Fukuoka (JP)

(*) Notice: Subject to any disclaimer, the term of this patent is extended or adjusted under 35 U.S.C. 154(b) by 0 days.

(21) Appl. No.: 09/720,043
(22) PCT Filed: Jun. 17, 1998
(86) PCT No.: PCT/JP98/02683
§ 371 (c)(1), (2), (4) Date: Dec. 15, 2000
(87) PCT Pub. No.: WO99/66300
PCT Pub. Date: Dec. 23, 1999

(51) Int. Cl.[7] .................... B01D 53/22; G01M 3/04
(52) U.S. Cl. .................. 73/40; 95/45; 55/385.4; 96/4
(58) Field of Search .................. 73/38, 40, 40.5 R; 95/45; 96/4; 55/385.4

(56) References Cited

U.S. PATENT DOCUMENTS

| 5,131,929 A | * | 7/1992 | Brockmann et al. | 95/52 |
| 5,358,556 A | * | 10/1994 | Kaner et al. | 95/45 |
| 5,681,368 A | * | 10/1997 | Rahimzadeh | 95/19 |
| 5,885,329 A | * | 3/1999 | Hermann | 95/22 |
| 5,928,409 A | * | 7/1999 | Sirkar | 95/45 |

FOREIGN PATENT DOCUMENTS

| JP | 62-91830 | 4/1987 |
| JP | 4-157335 | 5/1992 |
| JP | 5-322060 | 12/1993 |

* cited by examiner

Primary Examiner—Hezron Williams
Assistant Examiner—Michael Cygan
(74) Attorney, Agent, or Firm—Flynn, Thiel, Boutell & Tanis, P.C.

(57) ABSTRACT

A method and an apparatus confirms airtightness of a closed space in a housing provided with a steam movement control device. The apparatus includes an air feed passage and an air exhaust passage, which communicate with an interior of the housing. The air feed passage connects to a gas injection device, which supplies a gas at a predetermined pressure. The air exhaust passage connects to a pressure gauge. In the method, while gas at a predetermined pressure is injected into the housing through the air feed passage, pressure measurement is performed in the air exhaust passage from the housing, and a measured pressure value is compared with an injection pressure value. When the measured pressure value is substantially equal to the injection pressure value, airtightness in the housing is maintained. When the measured pressure value is lower than the injection pressure value, airtightness has been lost.

4 Claims, 8 Drawing Sheets

METHOD OF AND APPARATUS FOR TESTING AIRTIGHTNESS OF CLOSED SPACE PROVIDED WITH STEAM MOVEMENT CONTROL DEVICE

FIELD OF THE INVENTION

This invention relates to a method of and apparatus for testing airtightness of a closed space, which closed space is provided with a steam movement control device which is used as a humidifier, a dehumidifier and a humidity regulator, by controlling a direction of steam movement with specific waterproof membranes and their arrangement.

BACKGROUND OF THE INVENTION

The inventor has already disclosed a steam movement control device in Japanese Patent Laid-Open Publication No. 322060/1993. The steam movement control device has one ventilation hole communicated to an interior of a housing (closed space) and the other opened to atmospheric air. Multiple small chambers, which are separated by air and water vapor permeable, waterproof membranes, exist between the two ventilation holes. Steam movement is controlled so as to eliminate, add, or control humidity in the housing by applying air and water vapor permeability of waterproof membranes with temperature fluctuation speed between outdoor air and the housing.

The steam movement control device is, as shown above, attached to the housing (closed space). The steam movement control device functions on the condition that the airtightness of the housing (closed space) is maintained. Leakage which underruns the moisture control ability of the steam movement control device is tolerated because the leakage can be compensated by the moisture control ability of the device itself.

However, methods to confirm the airtightness of the housing (closed space) have not been established yet. At present, the airtightness is, at best, maintained by adopting a temporary drip proof or airtight structure. There are no methods to check the airtight state of a housing with a steam movement control device attached.

This invention was devised in consideration of the actual state of art. The purpose of this invention is to offer a method of and an apparatus for testing airtightness of a closed space, which airtightness is a prerequisite for installation of a steam movement control device.

DISCLOSURE OF THE INVENTION

The method of testing airtightness according to this invention is intended for a closed space which has two ventilation holes; one of which is communicated to an interior of a housing, and the other is opened to atompspheric air, and between said two ventilation holes small chambers are separated by air and humidity permeable, waterproof membranes and which is provided with a steam movement control device to control steam movement between said two ventilation holes. The configuration is that while predetermined pressure gas is injected into the closed space from an air feed passage to said closed space, pressure is measured in an air exhaust passage from the closed space and a measured pressure value is compared with an injection pressure value, and it is recognized that when the measured pressure value is substantially equal to the injection pressure value, airtightness in the housing is maintained, and when the measured pressure value is lower than the injection value, airtightness leaks.

The airtightness testing device which corresponds to this airtightness testing method is equipped with an air feed passage and an air exhaust passage communicated to the interior of the closed space. The air feed passage is connected with a gas injection device which feeds the gas at a predetermined pressure and the air exhaust passage is connected with a pressure gauge.

The airtightness testing method according to this invention is that while predetermined pressure gas is injected into a test space which communicates to inside of the closed space through a ventilation passage, pressure is measured in the test space and the measured pressure value is compared with a pressure value before injection, and it is recognized that when the measured pressure value is higher than the pressure value before injection, airtightness in the housing is maintained, and when the measured pressure value is substantially equal to the pressure value before injection, airtightness leaks.

The airtightness testing device which corresponds to this airtightness testing method is composed of a test space which communicates to the inside of the closed space through a ventilation passage, a gas injection device which supplies gas at a predetermined pressure and a pressure gauge to measure the pressure in the test space.

The said airtightness testing device is equipped with a closed space connection part which consists of a double tube, which tube is made up with an inner tube forming an air feed passage and an outer tube forming air exhaust passage. This closed space connection part is connected in detachable way to a connection hole which is formed on the closed space, and the inner tube protrudes from the end of the outer tube. Thus, the openings of the inner tube and the outer tube are distant from each other. In this case, the inner tube is formed with retractility to make the inner tube protruded from the outer tube opening at the extended state.

In the airtightness testing method, even when the airtightness of the closed space is recognized to leak, if the degree of leakage underruns the moisture control ability of the steam movement control device, the leakage does not necessarily be assumed to be a failure as the steam movement control device can function.

BRIEF DESCRIPTION OF TIE FIGURES

MOST PREFERRED EMBODIMENT OF PRESENT INVENTION

Figure 1:
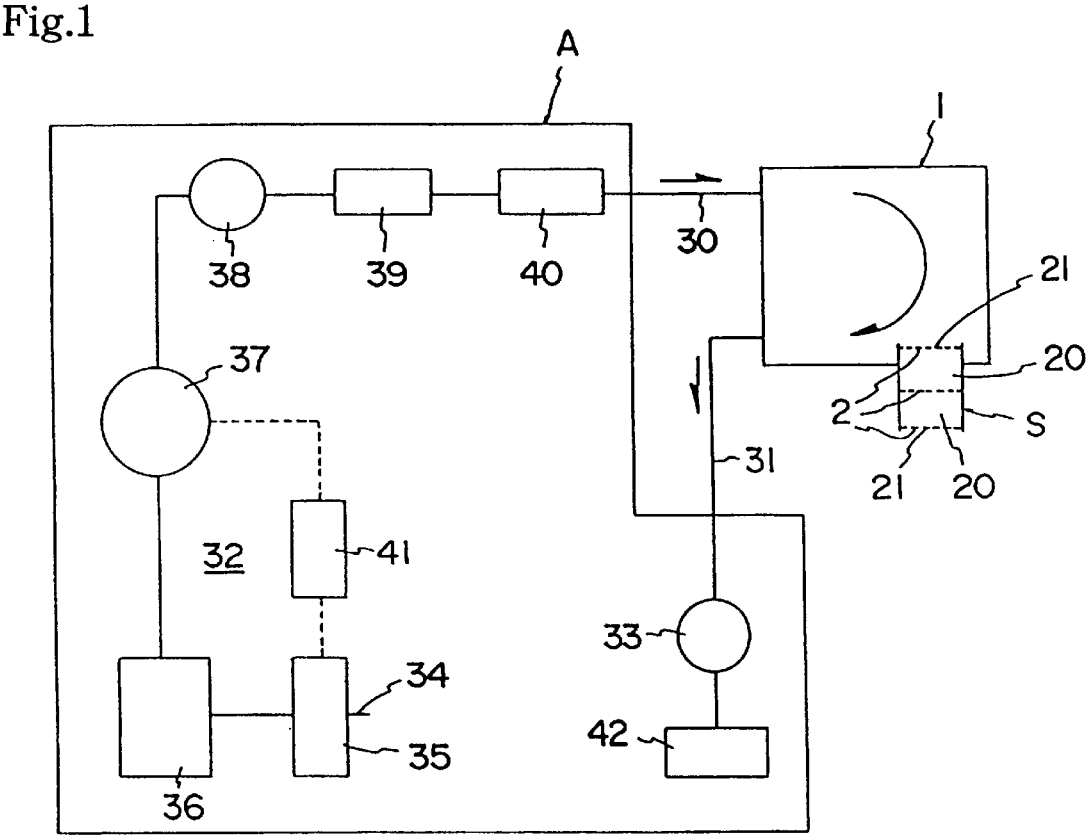
FIG. 1 is a schematic diagram of the first embodiment pattern of an airtightness testing device according to this invention.

Embodiments of the present invention now will be described with following figures. FIG. 1 shows an airtightness testing device. The following embodiments show examples which a housing is used as a closed space, and in the figures, the common signs are used for the same component parts.

The examination object of an airtightness testing device A is a housing 1 as a closed space which is equipped with a steam movement control device S. In addition to the housing 1, power cubicles which is installed at the top of a building, control boxes, switch boxes, spaces which have switch boxes and a certain closed path and the like are also assumed as closed spaces.

In the said steam movement control device S, two small chambers 20 and 20 between ventilation holes 21 and 21 are separated by three membranes 2, 2 and 2. The movement of steam is controlled between ventilation holes 21 and 21 by the steam movement control decice S. In the other words, one ventilation hole 21 is opened to atmospheric air and the other ventilation hole 21 is communicated to the interior of the housing 1. Steam movement is controlled in order to increase/decrease humidity (to control the humidity) in the housing 1 by means of the air and steam permeability of the above membranes 2 according to the speed of the temperature change between the ourter air and the inside of the housing 1.

There are two types of the steam movement control device S. One is the type which is powered only by environmental temperature fluctuation. The other is the type which is operated with a single minute electric device (e.g. Peltier element drive type, built-in drive fan type, built-in heater type, oscillation drive type) or a combination of those devices in addition to the environmental temperature fluctuation. Either of the two types can be used in this method. The later type is effective for preventing the steam movement in the opposite direction of the intended purpose by making use of the temperature fluctuation in order to hold back an occurrence of an effect against the humidity regulation, which effect is caused by diffusing of the steam from the inside of the device, in the closed space which is the object of controlling the himidity. The location of the steam movement control device S could be either top, under and side of the housing 1. It can be decided according to the situation.

The airtightness testing device A is equipped with an air feed passage 30 and an air exhaust passage 31 which are communicated to the inside of the housing 1. The air feed passage 30 is connected with a gas injection device 32 which feeds gas at a predetermined pressure, and the air exhaust passage 31 is installed with a pressure gauge 33 and a flowmeter 42.

The said gas injection device 32 is equipped with an air dryer 35 on which an air inlet 34 is formed, an air reservoir 36 which reserves the air dried by the air dryer 35, a diaphragm pump 37 which feeds the dried air from the air reservoir 36 to the air feed passage 30 at a predetermined pressure, a pressure gauge 38, a flowmeter 39 and a buffer tank 40 which flattens the pulse from the diaphragm pump 37, which are installed in the middle of the air feed passage 30

A battery 41 supplies driving power to the said air dryer 35 and the diaphragm pump 37. Instead of the said air dryer 35, a dehumidifier using the steam movement control device (Japanese Patent Laid-Open Publication No. 322060/1993) proposed by the inventor or the one where air passes through a tube filled with drying agents such as silica gel can be used. Extremely low humidity can be obtained with a combination use of these two types of dehumidifiers.

Now, an airtightness testing method using the airtightness testing device A will be explained.

Actuate the air dryer 35 and the diaphragm pump 37 after connecting the air feed passage 30 and the air exhaust passage 31 to the housing 1 to inject dried air from the air reservoir 36 through the air feed passage 30 into the housing 1 at a predetermined pressure. While injecting dried air, the pressure is measured by the pressure gauge 33 which is installed on the air exhaust passage 31, and the value is compared to the injection pressure indicated by the pressure gauge 38 which is installed on the air feed passage 30. It is recognized that when the measured pressure value is substantially equal to the injection pressure value, airtightness in the housing 1 is maintained, and when the measured pressure value is lower than the injection pressure value, the airtightness leaks. In other words, when the airtightness in the housing 1 is lost, air leakage will occur and the measured pressure value becomes lower than the injection value. However, even when the airtightness of the closed space is recognized to leak, if the degree of leakage is within the moisture control ability of the steam movement control device S, the leakage does not necessarily be assumed to be a failure as the steam movement control device S can carry out a function.

When testing, the pressure of the dried air which is injected to the housing 1 should be set to low (e.g. 0.084 atm for the membrane test which is specified in JIS-P-8117, 1980), as possible as near the ambient pressure in order not to apply stress to the sealing structure and the devices, which devices are installed in the interior of the housing 1.

In order to prevent the air leak from the steam movement control device S, a lid should be put on the ventilation hole 21 of the steam movement control device S to close the ventilation hole 21. If the injection pressure is set to the pressure which is near to the ambient pressure, it is not necessarily required to close the ventilation hole 21 with a lid, as the air passage is regulated by the resistance of the membrane 2 of the steam movement control device S. In this respect, in the first place, the steam movement control device S is installed on the housing 1, and the original purpose is to check whether airtightness is secured or not in the state that the steam movement control device S functions, so, it is desirable that the testing should be performed without closing the steam movement control device S. Thus, the injection pressure should be set to the pressure which is near to the ambient pressure.

It is also desirable that the quantity of the dried air which is injected into the housing 1 should be the minimum in order to shorten the testing time. For the purpose, actual capacity of the housing 1 should be measured. Thus, flowmeters 39 and 42 are installed on the air feed passage 30 and the air exhaust passage 31. Actual capacity of the housing 1 can be obtained from the following equation supposing it is ideal gas:

$$PY=nRT$$

(P: pressure, V: volume, n: mole number of gas, R: gas constant, T: temperature)

By the injection of dried air to the housing 1, the ambience before testing in the housing 1 will be replaced with the dried ambience where dried air is filled. It is most desirable to perform the testing at the point when the inside of the housing 1 is completely replaced with dried air. If steam is filled or condensation exists in the housing 1, it takes a long time to proceed into the replaced state and the testing time takes too long. In order to deal with this, temperature, humidity and density of the dried air which passes through the air feed passage 30, and of the air passes through the air exhaust passage 31 are measured with a thermometer and a moisture analyzer, etc. (not represented in the figures), respectively. Perform total judgment to adjust the measured pressure value by considering dried air quantity injected to the housing 1 and actual capacity of the housing 1. Finally, the measured pressure value after adjustment is compared to the injected pressure value. The reason why injecting the dried air into the housing 1 is to prevent the condensation accompanying pressure reduction after testing was finished.

In this testing method, based on the difference between the inner space state of the housing 1 and the gas injection device 32, if the temperature of the inner space of the housing 1 is higher than that of the gas injection device 32, injected gas is heated and expanded to be exhausted with the pressure which is higher than the pressure when injected. On the other hand, if the temperature of the inner space of the housing 1 is lower than that of the gas injection device 32, injected gas is cooled and deflated to be exhausted with the pressure which is lower than that of injection. If dried air is used as injection gas, fluctuation factors by steam pressure accompanying such temperature changes can be evaded.

For example, in the case where the temperature of the inner space of the housing 1 is higher than that of the gas injection device 32, the injected gas is heated and expanded. Furthermore, in the case where the dew point is located higher position, the injected gas is hardly affected by steam components or water, which are originally existed in the inner space of the housing 1. On the contrary, if the temperature of the inner space of the housing 1 is lower than that of the gas injection device 32, the injected gas is cooled and deflated. Steam components or water, which is originally existed in the inner space of the housing 1, has a low dew point. Furthermore, in the case that the degree of the dew point may have effect on the measurement in respect of pressure and injected air is not completely dried, the pressure component of water condensed steam, which component is of the pressure component of the injected air, will be further reduced.

The relational expression to obtain steam pressure and the dew point is as follows:

Expression to obtain steam pressure e: $e=Ues/100$

U: relative humidity, es: saturation steam pressure at temperature T, T: absolute temperature, $$es=\exp\{-6096.9385T^{-1}+21{,}2409642-2711193*10^{-2}T+ \\ 1.673952*10^{-5}T^2+2.4335021\ln(T)\}$$

The formula to obtain the dew point td from steam pressure es $$y=\ln(es/611.213Pa),$$

where $y \geq 0$:

$$td=13.715y+8.4262*10^{-1}y^2+1.9048*10^{-2}y^3+7.8158*10^{-3}y^4,$$

whre $y<0$:

$$td=13.7204y+7.36631*10^{-1}y^2+3.32136*10^{-2}y^3+7.78591*10^{-4}y^4.$$

In the above formulae, s and d in es and td respectively are originally subscripts.

Figure 15:
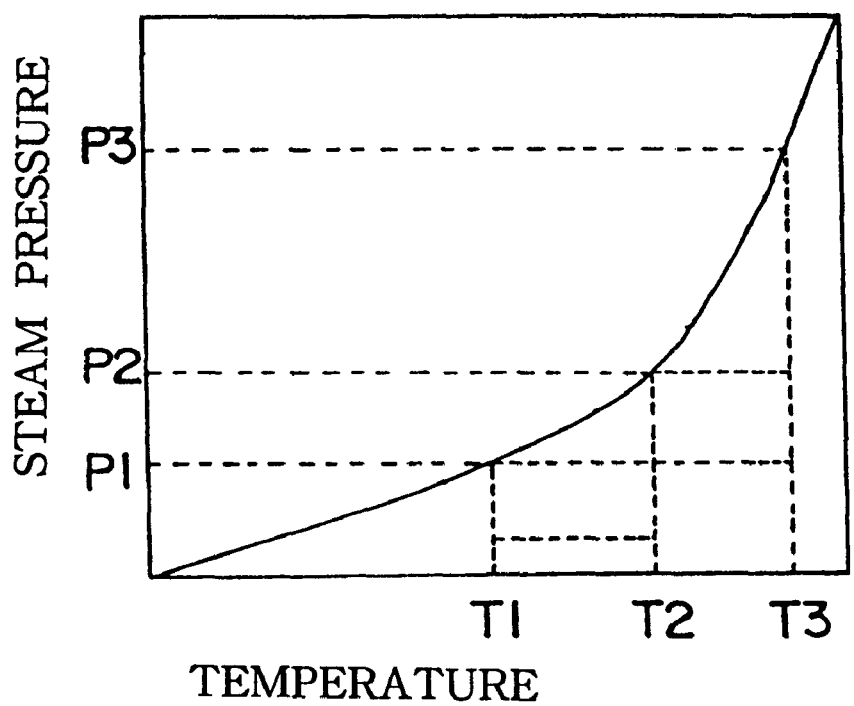
FIG. 15 is a graph to indicate the relation between the steam pressure and the temperature.

For example, as shown in FIG. 15, suppose that temperature falls from the temperature T3 corresponding the steam pressure P3. In the fall from T3 to T2, when steam of which pressure is between P3 and P2 becomes water, the steam pressure will reduce. In the fall from T3 to T1, when steam of which pressure is between P3 and P1 becomes water, the steam pressure will reduce.

On the contrary, if the temperature rises from T1, considering steam is ideal gas, the corresponding steam pressure will rise.

Critical compression factor is an effective method to perform these tests using a pressure which approximates to the ambient pressure. Using this method, error compensation for the pressure results which is obtained for the exhaust side could be performed by steam components.

If a microcomputer is set to calculate these relations in order to obtain the back pressure components automatically, the device can be used effectively as a handy airtightness testing device. This testing device, the size of a steam movement control device is selected and compensation conditios shown above are obtaied, being based on the results which is produced by measurement of the actual internal volume of the housing 1. In this case, the actual internal volume can be calculated by measuring the time lag until the indications of both pressure gauges 38 and 33 or both flowmeters 39 and 42 became identical.

Figure 2:
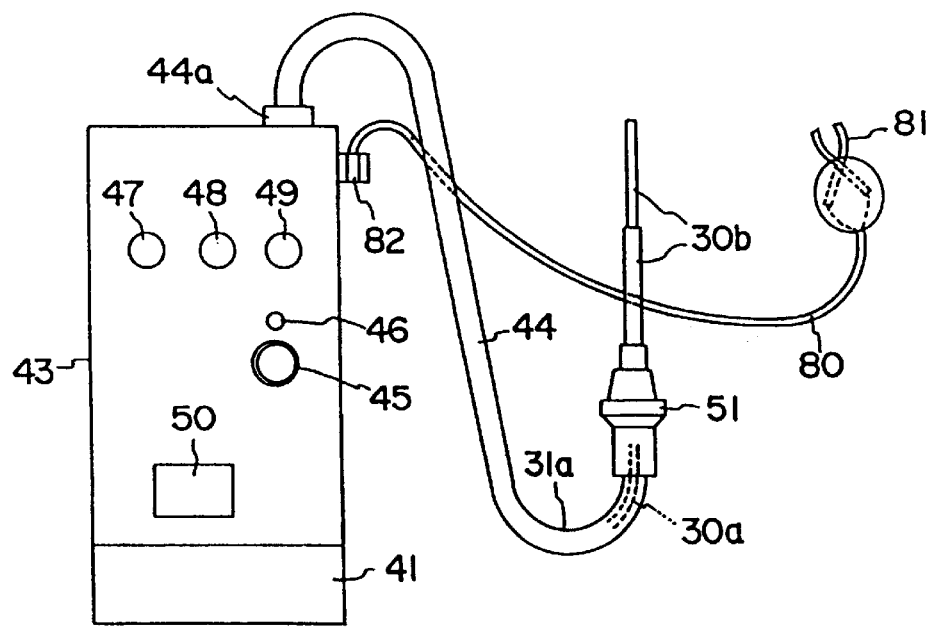
FIG. 2 is an outside drawing of the airtightness testing device according to this invention.

As shown in FIG. 2, the airtightness testing device A is equipped with a casing 43 which contains above-mentioned gas injection device 32, the pressure gauge 33, etc. A probe 44 (housing connection part), which is formed with a double tube, which tube consists of an inner tube 30a (forming the air feed passage 30) and an outer tube 31a (forming the air exhaust passage 31), is protruded from the casing 43.

Figure 3:
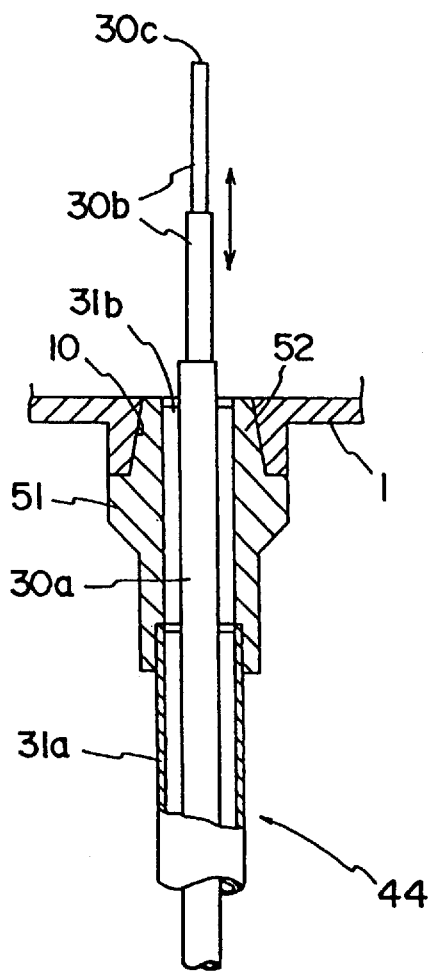
FIG. 3 is a cross sectional view of the tip of a housing connection part (probe) located on the airtightness testing device.

Above-mentioned casing 43 is mounted with a run switch 45, a pilot lamp 46 for the run switch, a pressurization indication lamp 47, a normal state indication lamp 48, a leakage indication lamp 49 and an injection amount adjusting switch 50 on the surface. Comparisons and judgments between measured pressure value and injection pressure value are performed through calculation control by built-in microcomputer. The above-mentioned probe 44 is formed with insulating material in flexible style and the end is connected to the connection hole 44a, which is protruded from the casing 43, in detachable way. A connector 51 is mounted on the tip. Now FIG. 3 explains the probe 44. A taper tube 52, which is fitted into a connection hole 10 (tapered hole formed at an appropriate position of the housing 1) with a single motion, is formed at the tip of the connector 51. An outer tube opening 31b is located at the tip of the connector 51. On the other hand, an inner tube tip 30b, which protrudes from the outer tube opening 31b, is formed at the tip of the inner tube 30a. An inner tube opening 31c of the inner tube tip 30b is so formed as to be kept off the outer tube opening 31b and located at the back of the housing 1. The reason why the inner tube opening 30c is kept off the outer tube opening 31b is that the dried air injected from the inner tube 30a should be exhausted from the outer tube 31a before the air is filled in the housing 1 if the inner tube opening 30c and the outer tube opening 31b stand close. It also has a purpose to exhaust the inner air effectively before testing and replace it with dried air preventing the above phenomenon. The said connector 51 and the inner tube tip 30b are also formed with insulating material.

The said inner tube tip 30b is formed extendable by the structure where tubular parts whose diameter becomes smaller gradually toward the tip are linked. At the extended state, the inner tube tip 30b protrudes from the outer tube opening 31b. At the shortened state, it is retracted in the connector 51. FIG. 2 shows a ground line 80 with an alligator clip 81 fixed at the tip. The end of the line 80 is connected to the terminal 82 which is protruded from the casing 43.

Figure 4:
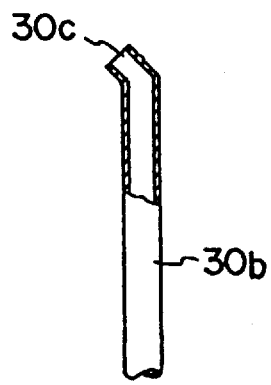
FIGS. 4–7 are cross sectional views of an inner tube opening located on each probe.
Figure 5:
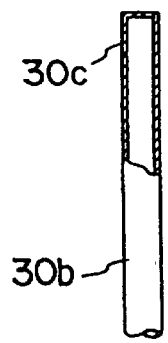
Figure 6:
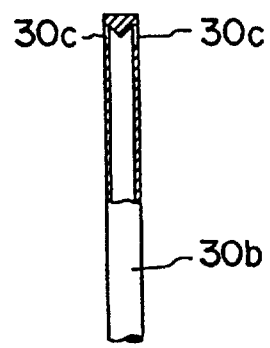
Figure 7:
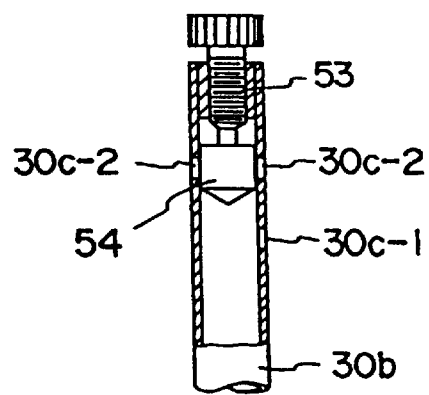

FIGS. 4–7 show embodiments of the inner tube opening 30c. FIG. 4 shows an embodiment where the tip of the inner tube opening 30c is opened to an oblique direction by bending the inner tube tip 30b at an angle. FIG. 5 shows another embodiment where the inner tube tip 30b is closed and one inner tube opening 30c is located in lateral direction at the periphery of the tip. FIG. 6 shows two inner tube openings, 30c and 30c, are located laterally in the opposite direction to each other at the periphery of the inner tube tip 30b. FIG. 7 shows the other embodiment where a downside inner tube opening 30c-1 is located laterally at the periphery of the inner tube tip 30b and two upside inner tube openings 30c-2 and 30c-2 are located laterally in the opposite direction to each other at the position which is more distal from the downside inner tube opening 30c-1, and a plug 54, which opens/closes the above-mentioned upside inner tube openings 30c-2, is fixed to the tip of the elevation(increase)/descent(decrease) screw 53 which is screwed into the inner tube tip 30b. If the elevation (increase)/descent(decrease) screw 53 is descended, two upside inner tube openings 30c-2 and 30c-2 are closed and only the downside inner tube opening 30c -1 is active. If the elevation(increase)/descent (decrease) screw 53 is elevated, two upside inner tube openings 30c-2, 30c-2 and the downside inner tube opening 30c-1 become active. By this, dried air can be injected according to the size and shape of the housing 1. If the inner tube opening 30c is opened to an oblique direction or in lateral direction, it is desirable to indicate a mark on the side of the connector 51 in order to identify the opening direction when attaching the connector 51.

Figure 8:
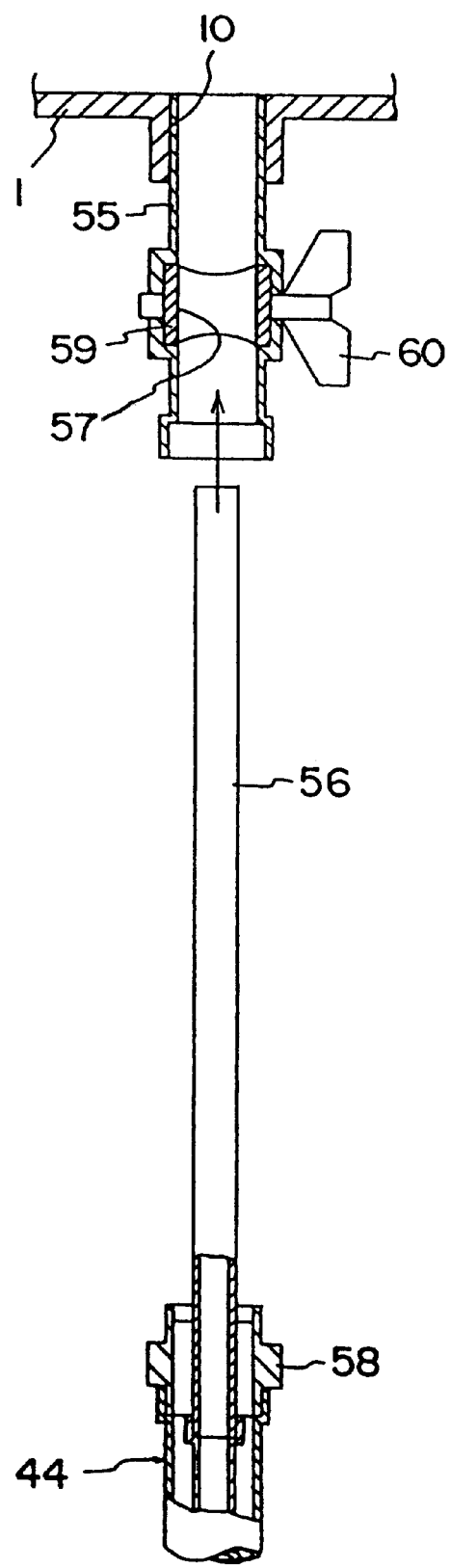
FIG. 8 is a cross sectional view of the other embodiment of the housing connection part.

FIG. 8 shows a cross sectional view indicating another embodiment of the probe 44. In this embodiment, an outer tube part 55 is previously inserted into the connection hole 10 which is formed at the appropriate location on the housing 1, and an inner tube part 56, which is inserted into the above said outer tube part 55, is protruded into the tip of the probe 44. A switch valve 59 is fixed at the halfway of the outer tube part 55. A tube hole 57 is formed on the switch valve 59 for penetration of the inner tube part 56. So, if the switch valve 59 is rotated 90° by pinching a butterfly knob 60, the tube hole 57 turns sideways to close the switch valve 59. From this position, if the switch valve 59 is rotated 90°, the tube hole 57 of the switch valve 59 is opened. In this state, if the inner tube part 56 is inserted into the outer tube part 55, the inner tube part 56 is protruded into the inside of the housing 1 through the tube hole 57. The part 58 in the figure is a connector. It is formed at the tip of the probe 44 to be fitted detachably to the lower end of the outer tube part 55.

Figure 9:
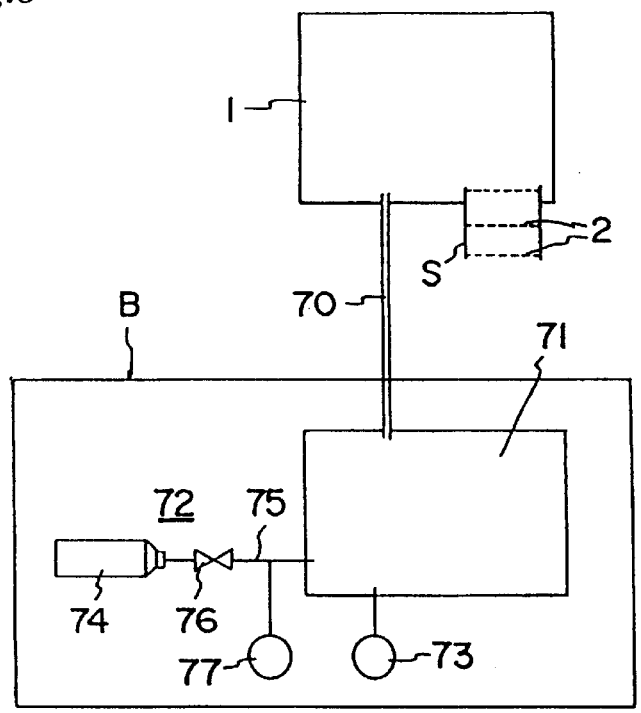
FIG. 9 is an explanatory drawing of the second embodiment pattern of an airtightness testing device according to this invention.

FIG. 9 is an explanatory drawing to show the second embodiment of an airtightness testing device.

This airtightness testing device B is equipped with a test space 71 which communicates to the inside of the housing 1 through a ventilation passage 70, a gas injection device 72 which supplies gas into the test space 71 at a predetermined pressure and a pressure gauge 73 to measure the pressure in the test space 71. In this case, the gas injection device 72 includes an air bomb (tube) 74, in which dried air is compressed and trapped, connected to the test space 71 through an air feed passage 75. A pressure-regulating valve 76 and a pressure gauge 77 are mounted on this air feed passage 75.

For the airtightness testing using this airtightness testing device B, the pressure in the test space 71 is measured by the pressure gauge 73 after connecting the ventilation passage 70 to the housing 1, while the dried air from the air bomb(tube) 74 is injected to the test space 71 through the pressure-regulating valve 76. It is recognized that when the measured pressure value is substantially higher than the pressure value before injection, airtightness in the housing 1 is maintained, and when the measured pressure value is almost the same as that before injection, airtightness leaks.

In this case, the actual inner volume of the housing 1 can be calculated by measuring the time lag until indications of pressure gauges 73 and 77 become identical.

Figure 10:
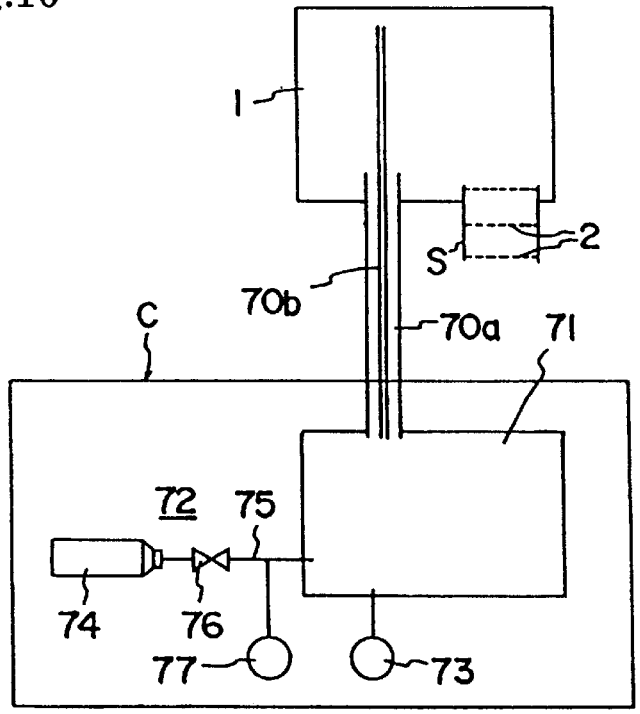
FIG. 10 is an explanatory drawing of the third embodiment pattern of an airtightness testing device according to this invention.

Referring now to FIG. 10, an explanation drawing of the third embodiment of an airtightness testing device. This airtightness testing device C has a feature that the housing 1 and the test space 71 are connected to each other with a large diameter ventilation passage 70a and a small diameter ventilation passage 70b. In this embodiment, a specific quantity of the air in the housing 1 flows into the test space 71 with by the difference of resistances in the tube between the large diameter ventilation passage 70a and the small diameter ventilation passage 70b, accompanying air injection. Thus, the atmosphere in the housing 1 can be imported to the inside of the test space 71. The error conditions at airtightness testing can be obtained from the measurement of the atmosphere (temperature, humidity, the dew point, etc) in the housing 1 and, at the same time, the actual internal volume of the housing 1 can be calculated considering the obtained error condition.

Figure 11:
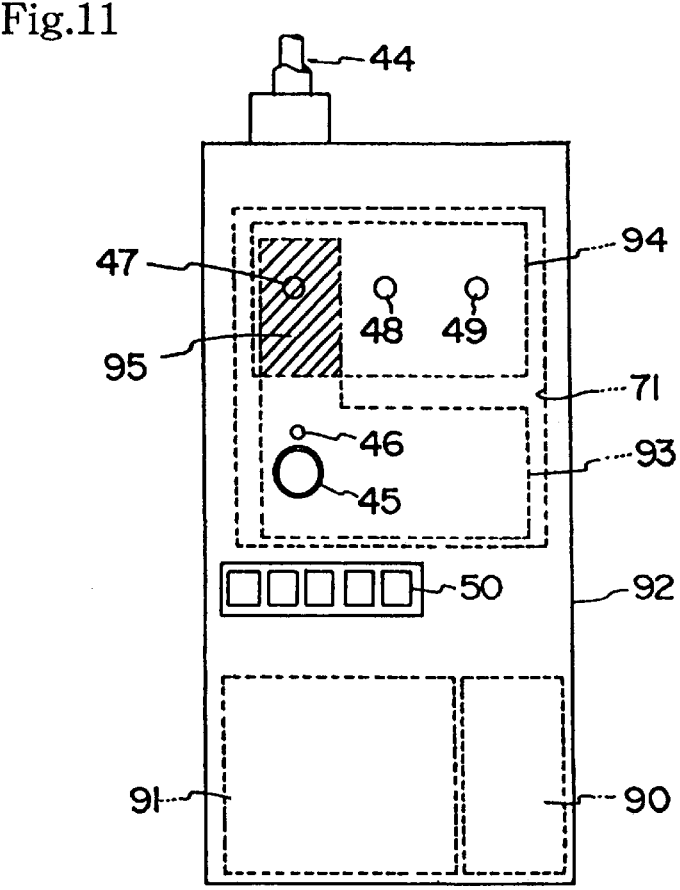
FIG. 11 is an outside drawing of the airtightness testing device according to this invention.

As shown in FIG. 11, the above-mentioned airtightness testing device C (or B) is equipped with a casing 92, which contains an air bomb(tube) storage 90, a battery storage 91, in addition that, a gas injection device, a pressure gauge (they are not illustrated), the test space 71, etc. The probe 44 is protruded from this casing 92 to form the air feed passages 30a and 30b (or air feed passage 30).

Above-mentioned casing 92 is fitted with the run switch 45, the pilot lamp 46, the pressurization indication lamp 47, the normal state indication lamp 48, the leakage indication lamp 49 and the injection amount adjusting switch 50 on the surface. The comparison and judgment between measured pressure value and injection pressure value are performed through calculation control by a built-in microcomputer.

The actual internal volume of the housing 1, which is estimated by the outer shape, should be set for the above said airtightness testing device B and C as a pre-test preparation. In this case, there are two methods. One is to set approximate actual internal volume obtained from the outer shape of housing 1 container and the mounted devices. The other is to calculate actual internal volume using pressure elevation time by air supply at a constant pressure level.

Then, temperature adjustment is performed for the test space 71. This work is done through the measurement of temperature and humidity of the test space 71.

At the start of a testing, the probe 44, which forms the ventilation passage 70 or 70a and 70b, should be inserted and fixed. Dried air is injected into the test space 71 from the air feed passage 75 by opening the valve of the air bomb (tube) 74. The testing start button may be set on the main body separately.

During the test, pressure elevation is checked with pressure gauges 77 and 73. If an elevation(increase) is recognized, the airtightness is considered to be favorable. In this case, the timing to obtain outputting information of the point of comtact of pressure gauges 77 and 73 varies according to the capacity of the housing 1 to be tested. So, the capacity setting should be done corresponding to the time when the air bomb(tube) 74 is opened by a timer. In the case airtightness is secured, the pressure will rise by opening the valve for the time corresponding to the capacity. In the case airtightness is not secured, the pressure will not rise even if the valve is opened for the time corresponding to the capacity.

A sensor, which supports the steam movement control device S and can detect a low pressure which does not impose a burden on the mechanism of the device S, should be used for testing preload by this testing method. The testig pre-load is converted into the fluctuation of pressure by the time, which is obtained by culculating back from the minimun air permeability of membranes in devices, and by the permeability acceleration, which is obtained from vapor and gas permeability. The airtightness testing should be performed for the minimum time required.

With regard to the relation between pressure measurement time and pressurize time, the timer should be started when pressurize operation and pressure elevation detection are ON, or by operating self-preservation circuit or latching relay. After the specified time, which is set by the timer, passed, the pressurize operation should be stopped by resetting the self-preservation circuit or by moving the latching relay to the opposite contact point side.

The relay is activated by detecting at the contact point the state that the probe 44 is set. Indication of detected pressure elevation(increase) will be displayed for a certain time until next test starts using the contact point information which is obtained as above.

When the main run switch 45 is turned on, contact point information from the relay or multiple circuits switch is detected. The timer will be activated from this point until some more time than the maximum capacity testing time passes. This can reduce power consumption of buttery while no testing is performed.

If a testing does not start in a specified time after the main run switch 45 was turned on, an alarm will sound or an indication lamp will light up. A measurement error can be reduced by restarting from a preparation phase.

Rechargeable batteries (NiCd battery, etc) should be used of power supply. The battery should contain a built-in small indicator for battery check and display an indication to evade any measurement error caused by battery failure.

The air feed passage 75 and the probe 44 should be constructed of substances having low heat conduction speed. Especially, for the probe 44, materials whose temperature can be easily affected by the test space 71 or substances with low water absorbing property such as PVC, vinyl chloride, polyethylene should be used. By these materials, the probe 44 can be easily affected by the temperature and humidity ambience of the test space 71. These materials also prevent condensation in tubes such as the probe 44 and the air feed passage 75, reduce a measurement error and evade failures in the device.

Figure 12:
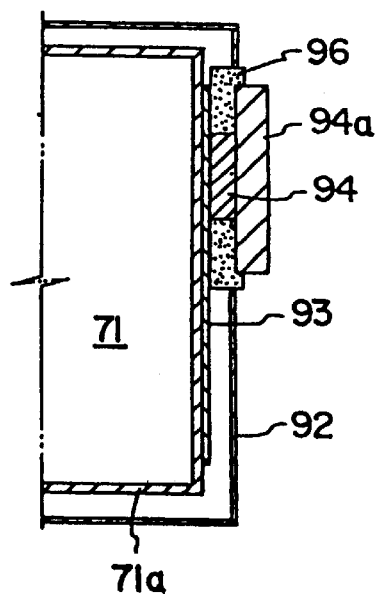
FIG. 12 is a grossly enlarged partially sectional view of a part of the airtightness testing device.

The test space 71 should be made of copper, brass, stainless steel, aluminum casting and the heat around it should be kept using insulation materials. The test space 71 should be made up of above materials with high heat conduction in order to adjust temperature of the pace 71 precisely. As shown in FIGS. 11 and 12, a sheet type heater 93 or a Peltier element 94 is used for fine adjustment of temperature. Dewdrops which are formed in the test space 71 should be drained through a drain. In FIG. 12, the part 96 is an insulation material such as porous ceramics.

The test space 71 should be cooled by a Peltier element 94. The cooling surface of the Peltier element should be fixed closely on the test space 71 and its radiation surface should contact a heat sink 94a exposed on the external surface of the casing 92. With regard to the operation required for the testing, typically, the main body of the airtightness testing device A, B, or C is gripped with one's left hand, or is put in the direction that measurement results can be seen. Thus, the sheet type heater 93 is located under the test space 71, the convection in the space 71 accelerated and the occurrence of measurement errors is prevented. It is also advisable to set a blushless fan in the test space 71 and to beat the inside air of the test space 71 with it in order to make the inner temperature distribution narrow.

Figure 13:
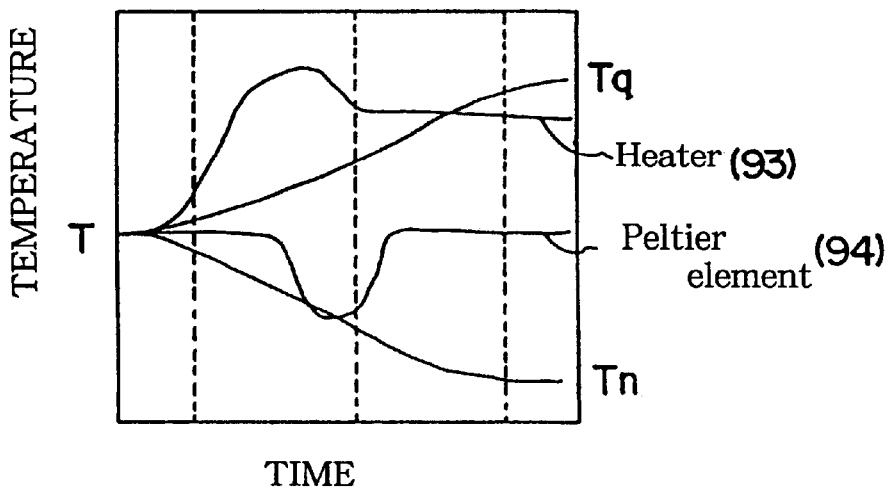
FIG. 13 is a graph of temperature change by a sheet shape heater and a Peltier element installed on the airtightness testing device.

If enough heat conduction in the test space 71 is secured by a test space container 71a, the sheet type heater 93 and the Peltier element 94 should be overlapped to make an overlapped area 95 as shown by the parallel diagonal lines in FIG. 11. As shown in the temperature fluctuation graph of FIG. 13, in the case the temperature rises from starting point T to the target temperature Tq or Tn, for example, the heater is activated in order to reach the temperature Tq, then the Peltier element 94 is cooled to avoid superfluous temperature rise. This prevents temperature conduction caused independently. For the temperature movement in the opposite direction (decrease of temperature), temperature fluctuation movement in the opposite direction is performed temporarily to approach the target temperature. These procedures should be set considering the area and the ability of the sheet type heater 93 and the ability of the Peltier element 94.

By this overlapping of the sheet type heater 93 and the Peltier element 94, in the case of heating the inside of the test space 71, for example, the test space container 71a is heated by the heater 93 and heat energy is transmitted to the Peltier element 94 and the heat sink 94a, which are attached closely to the test space container 71a.

This measurement device has a major premise that the temperature should never exceed the target temperature after reaching it. This premise is required to complete measurement work in a short time and to enhance the measurement accuracy.

Meanwhile, in the test space 71, the Peltier element 94 and other attached parts, all materials which have heat conduction depend on an environmental temperature before measurement. So, the target temperature should reach the target from the environmental temperature immediately after the starting of the measurement.

In addition to that, all associated parts have a certain mass. So, when the temperature reaches the target by appropriate heating for a certain time, a superfluous increase in temperature will be produced by the temperature movement to the test space 71 from all associated parts which reserve heat. This increase should be prevented by radiation from the Peltier element 94.

Considering this process, if heat conduction is performed between materials which have most ambivalent thermal effect in temperature control of the test space 71 which is constructed with materials with the fastest temperature transmission speed among other associated parts, the excessive temperature fluctuation will be controlled favorably.

In this process, the level of the effect, that consumption energy required for heating and cooling in order to reach the target temperature will be affected by the temperature of the environment where the measurement device is located, will be reduced. As the result, the time required for the measurement will be shortened.

For example, in the case the device is left to stand after heating, the temperature will rise being affected by the temperature of the environment where the measurement device is located. This process means occurrence of varied features caused by the ambient temperature. For example, excessive heating occurs when environmental temperature is high and it often takes much time for measurement when it is cold.

As the result, in the case by combination use of the heater 93 and the Peltier element 94, the test space 71 is heated to reach the optimal temperature which is targeted, for example, 20° C., relative humidity 65%, the most important issue is the thermal fluctuation of the thermal element itself. In other words, the temperature can be set effectively by establishment of said overlapped area 95 in order to settle contradict issues such as cooling of the test space container 71a after heating the test space 71, and heating of the heat sink 94a under the cool condition. If the test space container 71a has enough heat conduction speed, setting of the overlapped area 95 is not required.

Figure 14:
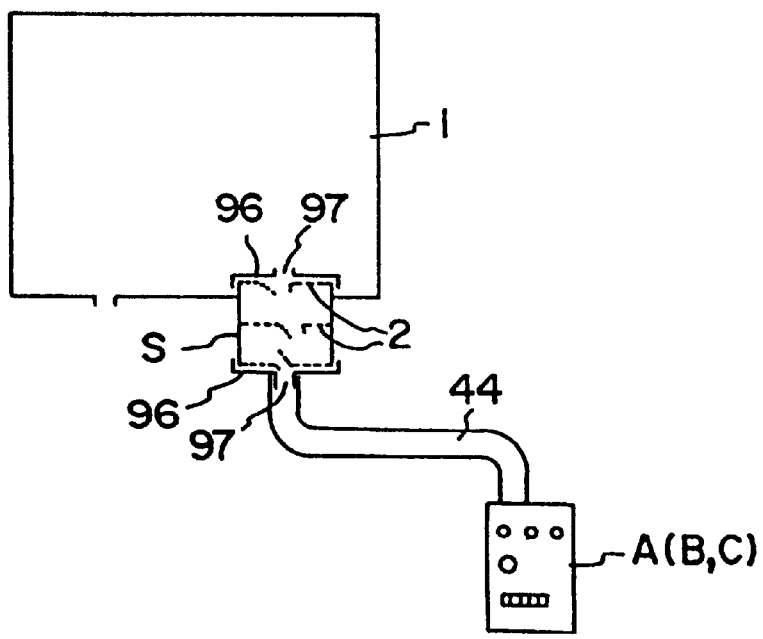
FIG. 14 is a schematic diagram of another use example of an airtightness testing device.

FIG. 14 shows an embodiment where the testing device (airtightness testing device A, B or C) of this invention is used for airtightness testing of the steam movement control device S. Membrane 2 of the steam movement control device S may be damaged as it cannot endure the sudden increase of the inner pressure when burnout occurs within the housing 1 caused by lightning stokes or failures of electric devices. In this case, the damage will be detected as a gas leakage from the housing 1 by the testing device. The existence of a break of membrane 2 in the steam movement control device S can be also detected.

A connecting adaptor 96 is fixed to a ventilation hole 21 of the steam movement control device S. And the probe 44 of the testing device A, B or C is fixed to the connection hole 97 of the connecting adaptor 96. In this structure, a testing is performed in the above-mentioned method. If it is recognized that airtightness is secured, there is no break of the membrane. If it is recognized that airtightness leaks, it can be decided that there is a break of the membrane. In this testing, the housing 1 may be either in the sealed or open state.

The testing method and testing device of the present invention is used for a closed space where a steam movement control device is equipped. It is optional to use them for a closed space before it is equipped with a steam movement control device.

Industrial Applicability

As mentioned above, the airtight state of a housing, as a prerequisite for installation of a steam movement control device, can be checked by the testing method and the testing device of the present invention. So, they can be used effectively for ensuring quality and performance guarantee of a steam movement control device.

What is claimed is:

1. An airtightness testing device intended for a closed space equipped with a steam movement control device for controlling steam movement between two ventilation holes, one of which holes communicates to an interior of the closed space and the other of which holes opens to atmospheric air, and between which holes multiple chambers are separated by water proof membranes which are permeable to air and water vapor, the device comprising:

a closed space connection part including a double tube having an inner tube forming an air feed passage on which a gas injection device to supply gas at a specified pressure is connected and having an outer tube forming an air exhaust passage on which a pressure gauge is mounted, both of which passages communicate to the interior of the closed space, the inner tube protruding from the end of the outer tube so that the openings of the inner tube and the outer tube stand off with respect to each other, the closed space connection part connecting in a detachable manner to a connection hole formed on the closed space.

2. The airtightness testing device according to claim 1, wherein the inner tube is retractably formed to protrude from the outer tube opening at an extended state.

3. An airtightness testing method intended for a closed space equipped with a steam movement control device to control steam movement between two ventilation holes, one of which holes communicates to an interior of the closed space and the other of which holes opens to atmospheric air, and between which holes multiple chambers are separated by water proof membranes which are permeable to air and water vapor, the method comprising:

supplying gas into a test space communicated to the interior of the closed space at a specified pressure through an air feed passage using a gas injection device; and measuring the pressure in the test space with a pressure gauge through an air exhaust passage, wherein a closed space connection part comprises a double tube having an inner tube forming the air feed passage and an outer tube forming the air exhaust passage, and the closed space connection part connects in a detachable manner to a connection hole formed on the closed space as well as the inner tube which protrudes from the end of the outer tube, whereby the openings of the inner tube and the outer tube stand off with respect to each other.

4. The airtightness testing method according to claim 3, wherein the inner tube is retractably formed to protrude from the outer tube opening at an extended state.

* * * * *